United States Patent Office 3,430,673
Patented Mar. 4, 1969

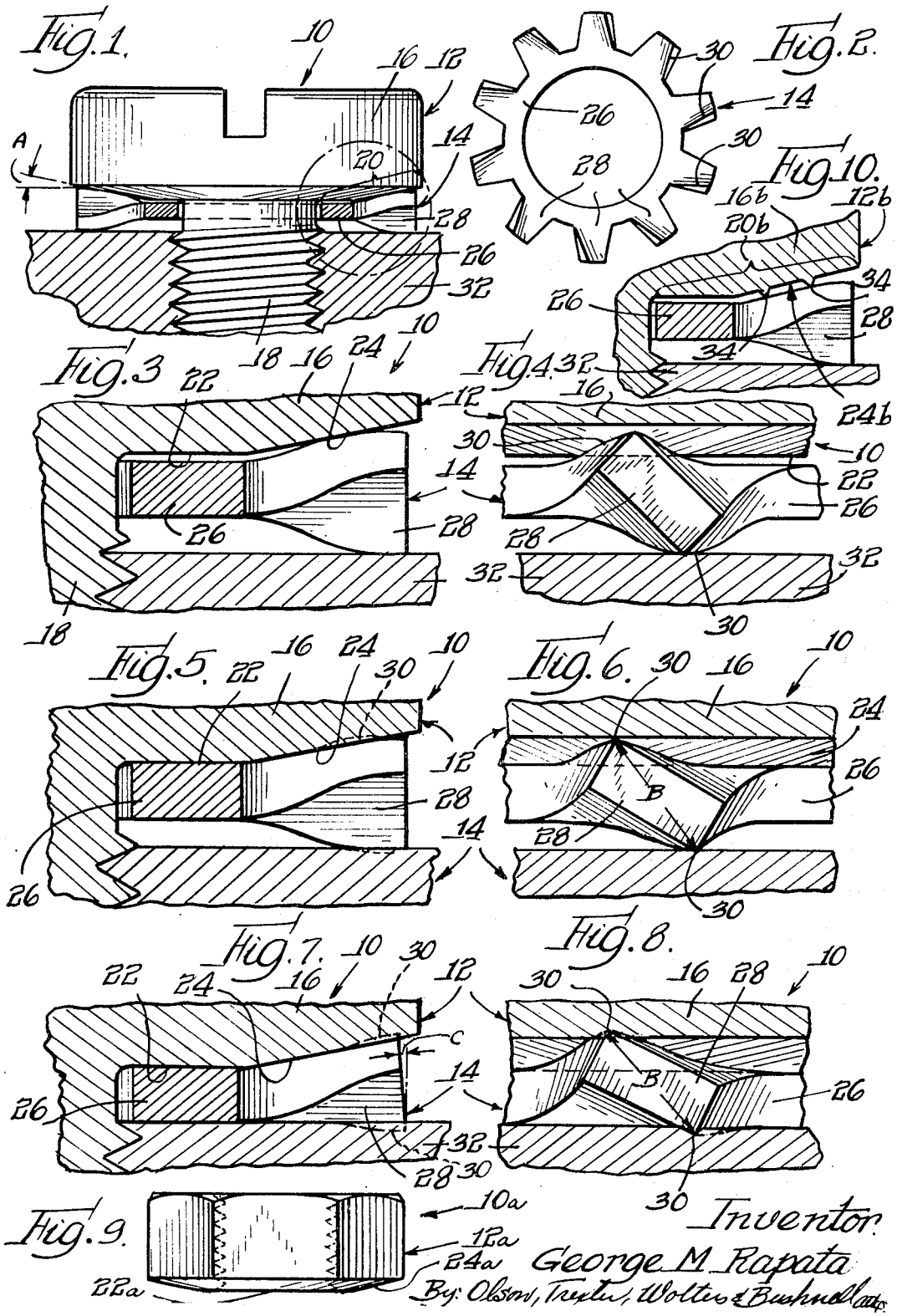

3,430,673
FASTENER UNIT
George M. Rapata, Park Ridge, Ill., assignor to Illinois Tool Works Inc., Chicago, Ill., a corporation of Delaware
Filed June 26, 1967, Ser. No. 648,626
U.S. Cl. 151—37                                     9 Claims
Int. Cl. F16b 39/26, 39/28, 39/12

ABSTRACT OF THE DISCLOSURE

Fastener units consisting of two parts, namely a rotary threaded fastener member such as a screw or nut having in association therewith a toothed lockwasher. More specifically, the invention contemplates a fastener unit of the type set forth above wherein the relative disposition and contour of a clamping surface of the rotary threaded fastener member and washer teeth superimposed thereby are such that when the inner annular body of the washer member is fully clamped against a complementary work surface, the washer teeth will maintain locking impingement with the work surface on one side and the clamping surface of the rotary threaded fastener member on the opposite side.

---

One of the problems incident to the use of toothed lockwashers beneath a clamping surface of a screw head or nut is that of preventing the washer teeth or prongs from becoming flattened when the washer is finally tighened or clamped against the work surface. Such flattening of washer prongs has a tendency to impair and, in certain instances, render ineffective the locking aggressiveness of the washer teeth.

An important object of the present invention is to prevent the above-mentioned flattening of lockwasher prongs without altering the design or shape of a conventional toothed lockwasher.

One type of lockwasher which has been in use for many years is a sheet metal washer having a flat annular body portion with a plurality of circumferentially spaced prongs extending radially from the margin of said body, each prong being twisted or warped so as to present locking teeth extending beyond opposite sides of the bounding planes of the washer body. When such a washer is tightened against a work surface so as to cause opposite sides of the washer body to be engaged by the work surface on one side and the clamping surface of the rotary fastener member on the other side, there may be a tendency for the locking impingement of the washer teeth to be rendered less effective due to the flattening of the prongs.

To meet this situation, the present invention contemplates one embodiment having a clamping surface area incorporating one section particularly designed for engagement with the inner washer body, and another annular clamping surface section of differing contour designed for lockingly impinging the washer teeth.

Still more specifically, the invention contemplates a lockwasher and rotary threaded fastener member of the type referred to above which lend themselves structurally for use as preassembled units, namely a rotary threaded fastener such as a screw or nut having a lockwasher rotatably supported adjacent to the clamping side of the rotary threaded member and secured against axial separation therefrom.

The foregoing and other objects and advantages will be more apparent from the following detailed description, when considered in connection with the accompanying drawing wherein:

FIG. 1 is a fragmentary side elevation of a rotary threaded fastener or screw of the present invention shown in operative association with a sheet metal externally toothed lockwasher, the lockwasher and associated workpiece being disclosed in section;

FIG. 2 is a plan view of an externally toothed sheet metal lockwasher of the type shown in FIG. 1;

FIG. 3 is an enlarged fragmentary sectional view of the area included within the dot-and-dash circle of FIG. 1, the rotary threaded fastener member as well as the lockwasher and workpiece being disclosed in section;

FIG. 4 is a fragmentary view as seen from the right of FIG. 3, both FIGS. 3 and 4 showing the clamping surface area of the rotary threaded fastener disclosed in its initial position of engagement with the lockwasher;

FIG. 5 is a view similar to FIG. 3, with the inner annular clamping surface section of the rotary threaded fastener brought into initial engagement with the adjacent complementary surface of the lockwasher body portion;

FIG. 6 is a view taken from the right of FIG. 5;

FIG. 7 is a view similar to FIGS. 3 and 5, after the body portion of the lockwasher has been clamped between the surface of the workpiece and the above-mentioned inner annular surface section of the rotary threaded fastener member;

FIG. 8 is a view taken from the right of FIG. 7;

FIG. 9 discloses a rotary threaded fastener member in the form of a nut having a clamping surface area constructed in accordance with the teachings of the present invention; and FIG. 10 is a fragmentary sectional view similar to FIG. 3, the frustoconical clamping surface section being provided with concentrically or helically disposed protuberances projecting axially from said surface.

Referring now to the drawings more in detail, wherein like numerals have been employed to designate similar parts throughout the various views, it will be seen that a fastener unit constructed in accordance with the teachings of the present invention is designated generally by the numeral 10. The fastener unit 10 includes a rotary threaded fastener member designated generally by the numeral 12, and a lockwasher member designated generally by the numeral 14. In FIG. 1 and in FIGS. 3–8, inclusive, the rotary threaded fastener member is in the form of a screw having a head 16 and a shank 18. The annularly disposed clamping surface area of the head is indicated by the bracket 20 in FIG. 1.

The annularly disposed clamping surface area 20 includes a surface section 22, the plane of which is substantially normal to the axis of the fastener member 12. The area 20 also includes a substantially frustoconical clamping surface section 24. The degree of inclination of the frustoconical clamping surface 24, as indicated by the letter A in FIG. 1, is preferably somewhat limited. It has been found that in instances where lockwasher teeth of the type disclosed herein are employed, this inclination may approximate 10°.

The lockwasher 14 disclosed herein is of the type formed from sheet metal and includes a body portion 26 and a plurality of radially extending prongs 28 spaced along the periphery of the body portion 26. The prongs 28 are preferably tapered in form as shown in FIG. 2 and each prong is progressively warped or twisted from the root thereof adjacent the body portion 26 to its outer extremity so as to present work-impinging or locking teeth 30 normally projecting axially beyond the opposite bounding planes of the body portion 26. The teeth 30 projecting from one side of the lockwasher are adapted to engage the frustoconical clamping surface section 24, and the teeth projecting from the opposite side are adapted to lockingly impinge the surface of a workpiece 32.

In FIGS. 1, 3 and 4 the rotary threaded fastener member or screw 12 is shown in initial engagement with the lockwasher teeth 30. Attention is directed to the fact that during this initial engagement the frustoconical clamping surface section 24 contacts the washer teeth 30, but the upper surface of the body portion 26 is spaced from the adjacent clamping surface section 22. As the screw 12 is tightened against the lockwasher 14, the clamping surface section 22 ultimately is brought into contact with the adjacent surface of the body portion 26 as shown in FIGS. 5 and 6. During this axial movement or shifting, the washer teeth 30 on one side are caused to lockingly impinge and, in fact, bite into the surface 24 and teeth on the other side lockingly engage the surface of the workpiece 22. The pressure exerted by the surface 24 against the lockwasher teeth also has a tendency to cause the prongs 28 to untwist slightly, as illustrated in FIG. 6 and thus increase impingement aggressiveness. In this position a strong strutting action is established, resisting the clamping forces along the line indicated by the letter B. As the clamping action continues, the washer teeth 30 not only increase their impinging aggressiveness against the surface 24 on one side and the work surface on the opposite side but, in fact, the prongs 28 actually experience a degree of bending or lateral deflection. Thus when the screw has been tightened so as to bring the surface 22 and the surface of the workpiece 30 into firm abutting relation with the adjacent surfaces of the body portion 26 as illustrated in FIGS. 7 and 8, the prongs 28 will have been flexed upwardly about an axis traversing the roots of the prongs. This causes the surface extremities of the prongs to become inclined slightly with respect to the vertical as illustrated by the letter c in FIG. 7. The teeth 30 of the prongs have now become firmly imbedded within the clamping surface section 24 of the screw 12 on one side and the surface of the workpiece 32 on the opposite side. In this position the locking prongs, although slightly untwisted from the position shown in FIG. 6, continue to exert powerful locking forces. The washer body portion 26 provides a firm abutment thus preventing any further untwisting of the washer prongs. In other words, the locking effectiveness of the washer teeth is maintained, and the possibility of complete flattening of the washer prongs is precluded.

Attention is directed to the fact that the present invention has a very practical application to preassembled lockwashers and rotary threaded fasteners. The thread convolutions on the screw shank 18 are slightly larger in maximum diameter than the internal diameter of the washer body 26, thereby trapping or securing the washer against axial displacement with respect to the screw head. The present invention is equally applicable for use with nut members such as the nut member 10a, shown in FIG. 9. Numerals having the suffix a are employed in FIG. 9 to designate corresponding, previously described structure.

In FIG. 10 a slightly modified form of frustoconical clamping surface section is shown. In this embodiment, the clamping surface section 24b is provided with a plurality of concentric axially extending protuberances 34. By having the clamping surface 24b thus formed, a restricted clamping surface area initially engages the washer teeth.

From the foregoing, it will be apparent that the present invention contemplates the provision of fastener units of the type described, having improved locking characteristics. By having the annularly disposed clamping surface area of the rotary threaded fastener presenting two distinct clamping surface sections, namely one clamping section extending substantially normal to the axis of the rotary threaded fastener, and the other section frustoconical in form, complete flattening of the washer prongs is avoided. In addition, clamping forces exerted against the washer prongs are not only met by forces tending to resist flattening of these prongs, but also by forces which result from the lateral flexing of the prongs about an axis in the vicinity of, and traversing, the root of each prong. This lateral deflection occurs as the internal annular body of the washer is shifted into engagement with the work surface. The above-mentioned forces exert very powerful resistance to forces tending to loosen the rotary threaded fastener member. By employing the frustoconical surface, increased radial extent of the clamping area provided thereby is obtained as compared with the normal flat clamping surface of a screw head or nut. The lockwasher teeth are in the form of curved edges as a result of the above-mentioned progressive twisting of each prong from its root to its free extremity. It will be noted that the frustoconical surface occupies a position substantially tangent to said curved teeth or edges upon initial engagement therewith (see FIG. 3). In order to obtain the above-mentioned advantages, it is important that, as the rotary threaded fastener member is brought into engagement with the lockwasher, the teeth of the lockwasher be engaged by the frustoconical clamping surface section before the inner clamping surface engages the washer body. This assures effective washer teeth impingement with the frustoconical surface on one side and the work surface on the opposite side.

While for purposes of disclosure certain structural embodiments of the invention have been described herein, it should be understood that the invention contemplates other changes and modifications without departing from the spirit and scope of the appended claims.

The invention is claimed as follows:

1. A fastener unit including a rotary threaded fastener member having an annularly disposed clamping surface area, said surface area including a first annularly disposed surface section extending substantially normal to the axis of said fastener member for clampingly engaging a complementary marginal portion of a lockwasher and also including a second substantially frusto-conical surface section extending radially outwardly in a direction away from a complementary work surface to provide a relieved portion for clampingly engaging the adjacent marginal portion of said lockwasher, and a lockwasher adjacently positioned and freely rotatable with respect to said clamping surface area, said lock washer including an annular washer body portion superimposed by and in substantial parallelism with said first annularly disposed surface section and a plurality of prongs extending radially outwardly from the margin of said body portion with the axis of each of said prongs lying in a plane coincident with a plane of the washer body portion, said prongs being superimposed by said frusto-conical surface section and each entire prong being progressively twisted about said axis from its root to its free extremity so as to present surface impinging edges normally projecting from opposite sides of the bounding planes of said washer body portion, the relative disposition of said frusto-conical surface section and washer teeth superimposed thereby being such that said frusto-conical surface section is tangent to at least a portion of one edge of each of said prongs and further disposed so that when the washer body portion is fully clamped between said first surface section and a complementary work surface, the washer prongs will not be completely flattened.

2. A fastener unit as set forth in claim 1 wherein the first annularly disposed surface section is located along the inner margin.

3. A fastener unit as set forth in claim 1 wherein the inclination of the frustoconical surface section to a plane normal to the fastener axis is in the vicinity of ten degrees (10°)

4. A fastener unit as set forth in claim 1 wherein the washer teeth comprise substantially radial edges positioned on opposite sides of the washer body.

5. A fastener unit as set forth in claim 4 wherein the edges presenting locking teeth are curved and the frustoconical surface section is substantially tangent thereto upon initial engagement therewith.

6. A fastener unit as set forth in claim 1 wherein the disposition of the washer teeth with respect to the washer body is such that when the second surface section initially engages the washer teeth, the washer body portion is spaced axially from the first surface section.

7. A fastener unit as set forth in claim 1 wherein the washer prongs as viewed in plan are narrower at their free extremities than at their roots.

8. A fastener unit as set forth in claim 1 including means on the rotary threaded member for securing the lockwasher against unauthorized separation from the rotary threaded member.

9. A fastener unit as set forth in claim 1 wherein the disposition of the washer teeth, washer body and surface clamping sections of the rotary threaded member is such that said prongs will flex laterally about an axis traversing the roots thereof as the first surface section shifts the washer body portion into engagement with a complementary work surface.

References Cited
UNITED STATES PATENTS

| | | | |
|---|---|---|---|
| 1,788,735 | 1/1931 | Olson | 151—35 |
| 2,228,284 | 1/1941 | Olson | 151—37 |

CARL W. TOMLIN, *Primary Examiner.*

RAMON S. BRITTS, *Assistant Examiner.*